Oct. 10, 1967      J. C. CUMMING      3,346,077
FLOATING CAM BRAKE

Filed June 24, 1966      2 Sheets-Sheet 1

INVENTOR
JAMES C. CUMMING

BY
Strauch, Nolan, Neale, Nies & Bronaugh
ATTORNEYS

Oct. 10, 1967

J. C. CUMMING 3,346,077

FLOATING CAM BRAKE

Filed June 24, 1966

INVENTOR
JAMES C. CUMMING

BY
Strauch, Nolan, Neale, Nies & Bronaugh
ATTORNEYS

United States Patent Office 3,346,077
Patented Oct. 10, 1967

3,346,077
FLOATING CAM BRAKE
James C. Cumming, Pleasant Ridge, Mich., assignor to Rockwell-Standard Corporation, Pittsburgh, Pa., a corporation of Delaware
Filed June 24, 1966, Ser. No. 560,192
4 Claims. (Cl. 188—78)

ABSTRACT OF THE DISCLOSURE

An internal drum vehicle brake comprising primary and secondary brake shoes pivotally anchored at one end in which the primary shoe is equipped with a brake lining of substantially thicker cross section than the secondary shoe. A cam initially in off-center position between the free ends of the shoes is repositioned towards the center of the brake in accordance with the amount of lining wear on the primary shoe and a friction retaining means holds the cam in adjusted position.

---

The present invention refers to brakes for automotive vehicles and in particular to floating cam operated internally expanding wheel brakes.

The vehicle brakes with which the present invention is primarily concerned are of the fixed anchor type and comprise a pair of brake shoes pivotally mounted at one end of a spider or backing plate within a surrounding brake drum. The brakes are operated by a rotatable S-cam disposed between the free ends of the brake shoes. To apply the brakes the cam is rotated by an actuator, usually an air operated diaphragm motor, to spread the free ends of the shoes apart and force them against the surrounding drum.

Co-pending application, Serial No. 551,818 filed Mar. 28, 1966, discloses a mechanical cam actuated brake embodying a floating cam mechanism in which the cam shifts from an initial off-center position towards a centralized position as the lining on the primary shoe wears off. In this type of brake a uni-directional adjusting or centralizing mechanism must be provided to retain the cam and brake shoes in the position to which they are moved as wear on the brake lining of the primary shoe progresses.

Usually such brakes are oriented to dispose one shoe above the other. The adjusting or centralizing mechanism also prevents the upper shoe from exerting a force on the cam opposite to the direction in which the cam is repositioned and thus tending to eliminate the purpose of the cam shift. Further, in brakes which are mounted in a substantially horizontal position the lower shoe, which may be the primary shoe or the secondary shoe depending on brake drum rotation, has a tendency to be moved into the drum by gravity. Such movement is prevented only by means of the return spring. However, in a floating cam arrangement of the type in which the cam is readjusted towards the lower shoe when this is the primary shoe, the brake shoe return spring alone will not be sufficient to prevent the shoe from being urged into the drum so that a holding or restraining device is necessary to keep the lower shoe out of contact with the drum.

In the aforementioned co-pending application this centralizer or position maintaining device is effective to limit return movement of the upper shoe in a horizontally installed brake. A spring urges the lower shoe and the cam against the upper shoe in the new returned position of the latter. Thus, the brake shoe movement effects the repositioning of the cam.

It is the principal object of the present invention to provide an improved simplified arrangement in which the centralizer or position maintaining device acts directly on the cam so that the cam movement effects the repositioning of the shoes.

The centralizer of the present invention is a positioning device normally held in fixed position by a friction force which is insufficient to resist the brake shoe application force exerted by the cam but is large enough to resist the force exerted by the weight of the brake shoe assembly. Thus, the cam will be progressively advanced in one direction and frictionally held in its advanced position.

The novel features of the present invention will become more apparent from the following detailed description in connection with the attached drawings in which.

Figure 1:
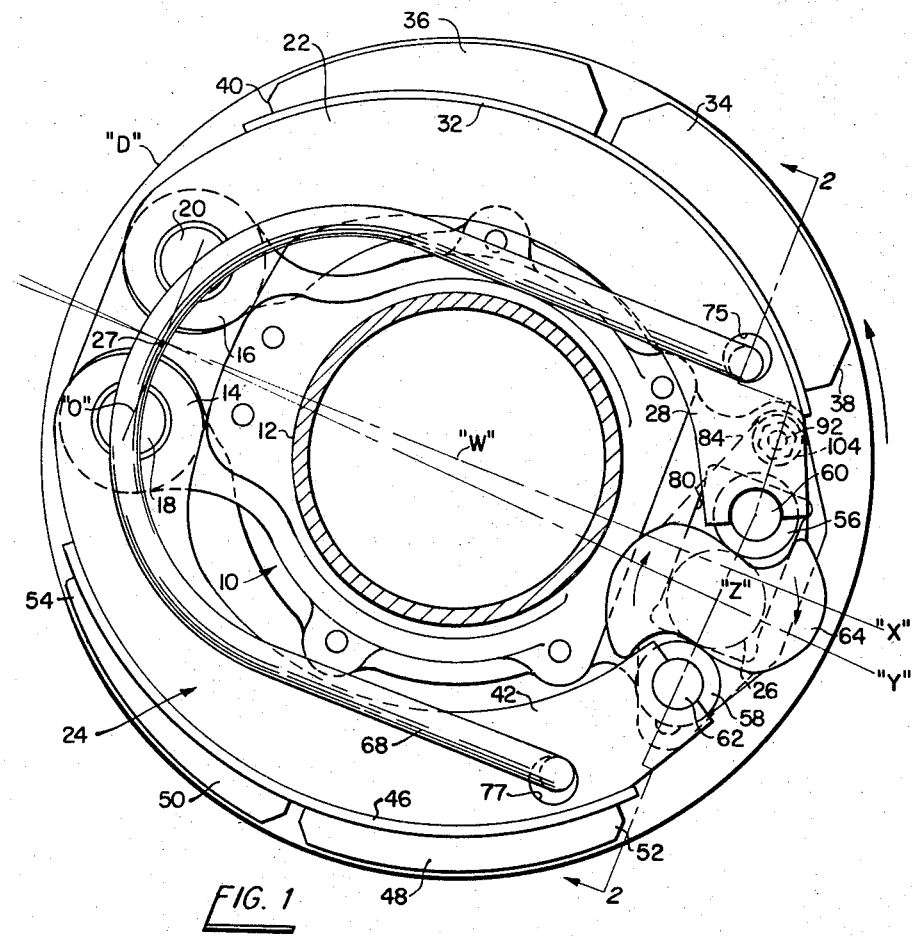
FIGURE 1 is a plan view of a cam actuated brake shown in a position as it would be actually installed in a vehicle and embodying the present invention.

With reference to the drawings, the brake illustrated in FIGURE 1 comprises a brake support or spider 10 usually rigidly secured to an axle 12 by welding or similar means. Spider 10 is provided at one end with adjacent aligned bosses 14 and 16 at opposite sides of the brake centerline X containing the axis W of the axle 12. Bosses 14 and 16 carry pins 18 and 20 which pivotally support the anchor end of a primary brake shoe 22 and a secondary or trailing shoe 24.

The brake shoes 22 and 24 are initially installed on opposite sides of a center line indicated at Y which is angularly displaced from the actual brake or spider centerline X and which contains the axis Z of the cam shaft 26. Both centerlines X, Y converge and intersect at a point 27 which is in the center of a centerline O drawn through the axes of the anchor pins 18, 20. As will be explained hereafter, during the course of successive brake applications the offset brake shoe and cam shaft centerline Y will be progressively advanced towards the actual brake centerline X as the lining wears on the primary shoe 22 which occurs at a faster rate than the wear on the secondary or trailing shoe 24.

Figure 3:
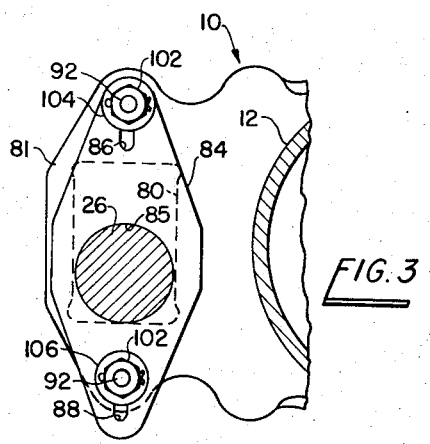
FIGURE 3 is an essentially vertical section taken along line 3—3 of FIGURE 2.

The primary or forward shoe 22 may be provided with a dual web structure comprising parallel web members 28, 30 (FIGURE 3) which are welded to the concave underside of a curved lining support 32 to which are fastened lining segments 34 and 36 secured thereto in any known manner as by riveting or bonding. Linings 34, 36 taper in thickness from the leading end 38 towards the trailing end 40 to compensate for the specific wear pattern inherent in such brakes.

The secondary or trailing shoe 24 is of similar construction and provided with a dual web structure comprising parallel web members 42 and 44 secured to the concave underside of a curved lining support 46 to which are fastened lining segments 48 and 50 which taper in thickness from the leading end 52 towards the trailing end 54.

It will, of course, be understood that the lining segments 34, 36 and 48, 50 may be of constant thickness throughout and instead of providing two segments for each shoe the lining for each shoe may be in one piece. It is for technical reasons only that the lining is provided in two segments to relieve internal stresses due to the curved configuration and to thus facilitate attachment of the lining to the shoe.

As shown in the drawings, the forward brake shoe lining segments 34, 36 are substantially thicker in section than the lining segments 48, 50 of the trailing shoe at a ratio of approximately 2:1. This feature is provided to compensate for the faster lining wear on the forward shoe which usually does more work in an anchored brake due to the particular geometrical force characteristic as is explained in greater detail in the aforementioned co-pending application, Serial No. 551,818.

The actuating ends of the brake shoes 22, 24 each receive cam followers 56 and 58 which are rotatable on trunnions 60, 62 by which the cam followers are retained between the respective web ends of the brake shoes. Positioned between the cam followers is an S-cam 64 which is integral with or welded to a camshaft 26 the axis Z of which extends parallel to the axis W of the axle 12.

Figure 2:
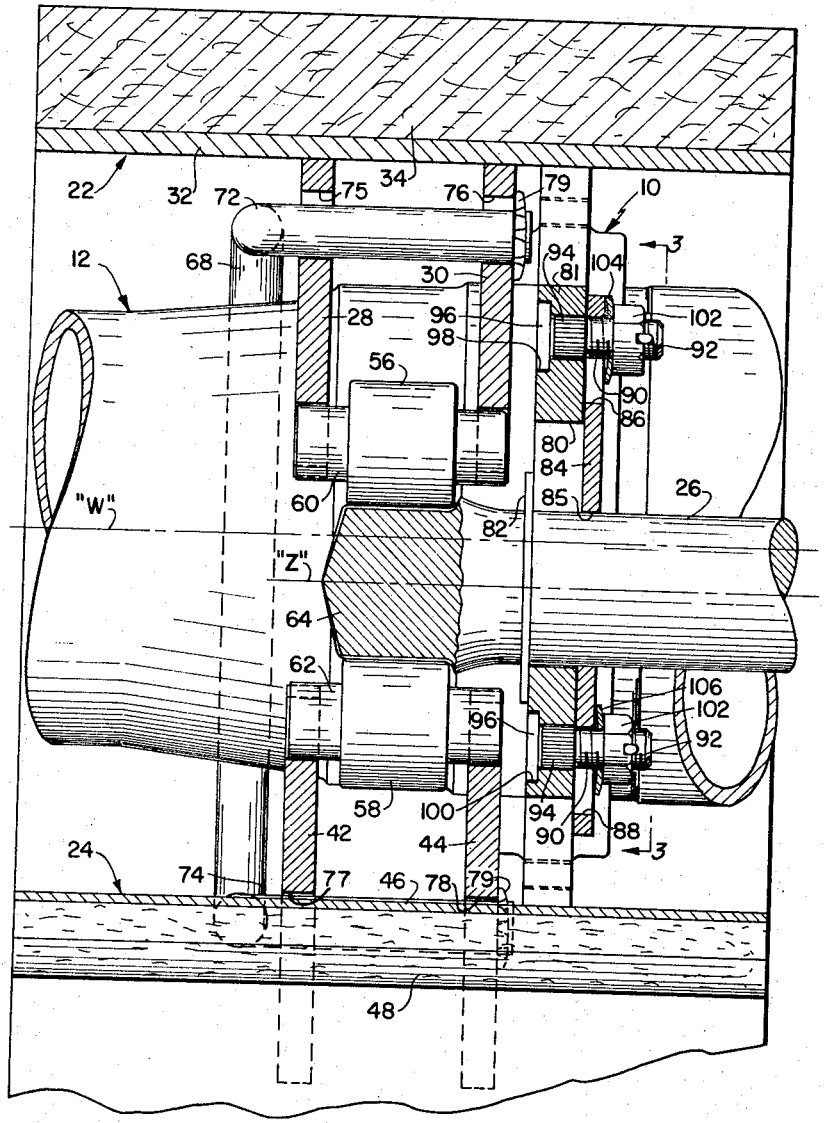
FIGURE 2 is an enlarged section through the brake actuating mechanism substantially along line 2—2 of FIGURE 1.

The brake shoes 22, 24 and the cam followers are urged away from the brake drum indicated at D into engagement with the cam 64 by a brake shoe return spring 68. The return spring 68 in this instance is a U-shaped piece of round spring steel wire extending around the axle 12 and whose free ends are bent at 72 and 74 (FIGURE 2) to be inserted into retaining holes 75, 76 and 77, 78 in webs 28, 30 and 42, 44 of the brake shoes 22 and 24, respectively, near the actuating ends thereof. Washers 79 at the spring ends hold the spring securely in assembled position. The return spring 68 may be of the general shape as disclosed in U. S. Patent No. 2,945,564, B. E. House et al., or may be a flat, tapered piece of spring steel as disclosed in U.S. Patent No. 3,095,950, W. F. Scheel, or, if sufficient room is available, conventional coil extension brake shoe return springs may be provided.

The inner end of the camshaft 26 is supported for rotation in an elongated aperture 80 provided in a flange portion 81 of the spider 10. The elongated aperture 80 is symmetrical on both sides of the brake centerline X and substantially of rectangular shape with its longer dimension extending normal to the centerline X. A thrust washer 82 (FIGURE 2) secured to the camshaft at the inner side of the spider 10 keeps the camshaft axially aligned and prevents it from axial movement outwardly of aperture 80.

When the brake is new camshaft 26 is initially located at one end of the rectangular aperture 80 which is farthest away from the primary shoe with the thicker lining so that upon brake application and subsequent lining wear the camshaft can travel within the rectangular aperture from one end towards the center in proportion to the amount of lining worn off the primary shoe. Thus, as shown in FIGURE 1, the camshaft whose centerline is indicated at Y is initially angularly offset from the actual brake centerline indicated at X at that side of the centerline which is opposite from the shoe with the thicker lining and gradually advances towards the centerline X upon successive brake applications. At the time the cam centerline Y is displaced so far that it coincides with the brake centerline X the linings on both shoes have been worn out completely and should be replaced.

The present invention is concerned primarily with means to centralize the brake shoes and cam assembly and to retain the assembly in adjusted position towards the brake centerline.

The improved friction adjusting mechanism comprises an oblong plate 84 lying flat against the flange section 81 of the spider 10. The plate is provided with an aperture 85 through which the cam shaft 26 extends with nominal clearance. The plate 84 is provided at its ends with slots 86, 88 which receive the shanks 90 of bolts 92. Serrations 94 provided on the bolts adjacent the shank portions 90 prevent the bolts from rotation in the apertures. The ends of the bolts adjacent the serrated portions 94 are provided with flat heads 96 which fit into counterbored recesses 98 and 100 in the spider flange portion 81 to thus keep the bolts from being extracted out of the spider. The other ends of the bolts which extend outwardly of the plate 84 are threaded to receive nuts 102. Inserted between the nuts 102 and the plate 84 overlying the slots 86, 88 are crowned friction washers 104 and 106 by which the plate 84 is frictionally retained against the spider flange 81 to allow restricted longitudinnal sliding movement relative thereto in the direction of the slots 86, 88 when a lateral force is exerted on the plate sufficient to overcome the friction resistance of the washers 104, 106 which force magnitude is adjustable by means of the nuts 102 according to the specific requirement in a particular brake assembly.

The plate 84 is moved in longitudinal direction along the spider flange 81 when the camshaft 26 is forced to move within its aperture 80 in the direction of the brake shoe actuation force since the plate is secured around the camshaft.

The device functions in the following manner. Upon brake application, when camshaft 26 is rotated (clockwise in FIGURE 1) the cam 64 spreads the brake shoes 22, 24 apart against the brake drum indicated at D which, in this instance, rotates in a counterclockwise direction as indicated by the arrow in FIGURE 1. When only minimal or no lining wear occurs, the brake shoe return spring 68 returns the brake shoe and cam assembly to its initial position with no movement having taken place at the plate 84. However, as the lining begins to wear on the primary shoe 22 to a greater extent than on the trailing shoe 24 the cam will first seat the secondary shoe 24. Upon further rotation the axis of the cam will be shifted toward the primary shoe, this movement continuing until the primary shoe is seated. In this movement the plate 84 is similarly displaced overcoming the resistance of the washers 104 and 106. Thus, the camshaft will be displaced from its initial position at the far end of aperture 80 towards the brake centerline X. Upon brake release, however, the weight of the brake shoe assembly will not be strong enough to override the friction force of the washers 104, 106. Thus, the plate 84 remains in its displaced position and retains the camshaft in its new position nearer to the actual brake centerline X. This process will be repeated whenever lining wear occurs on the primary shoe which is in excess of that worn off of the trailing shoe until the camshaft centerline Y coincides with the brake centerline X.

It will be understood that the normal pre-designed operating clearance between the brake shoes and drum will be consistently maintained throughout the life of the lining by any known manual or automatic brake adjusting devices separate from the present novel centralizer mechanism which do not affect each other. A preferred automatic brake adjusting device, in the form of a slack adjuster lever attached to the other end of the camshaft 26 is disclosed in U.S. Letters Patent No. 3,154,178 assigned to applicant's assignee.

It will be noted also that the frictionally retained camshaft support plate 84 prevents the upper shoe in FIGURE 1 from moving the cam and camshaft back into the opposite direction by means of its gravitational force. Also, in brake assemblies where the primary shoe is located at the bottom instead of at the top, the friction plate 84 prevents the bottom shoe from dragging due to the gravitational force together with vibrations which have a tendency to pull the shoe down into the drum. The operation of the present novel centralizer in a reversed shoe assembly is identical to that described herein.

Thus, the present invention provides an improved simplified centralizing mechanism for a floating cam brake which acts directly on the camshaft instead of on the shoes and which is located outside of the spider to facilitate servicing and adjustment.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a vehicle wheel brake assembly of the type having an axle mounted support on which primary and secondary brake shoes having linings thereon are mounted at adjacent ends on fixed axis pivots, the brake lining on said primary shoe being initially substantially thicker than the brake lining on said secondary shoe, a rotatable actuator cam disposed between the other ends of said shoes, a return spring urging said other ends of said shoes against said cam, an actuator shaft carrying said cam, said rotatable actuator cam and actuator shaft initially being positioned offset from a brake centerline, which includes the axis of the axle and a point midway the fixed pivots, means supporting said shaft for lateral displacement in a direction towards said brake centerline and towards said primary shoe, said shaft being automatically displaced in said direction by brake application forces as brake lining wear on said primary shoe progresses, and means surrounding said shaft and acting directly on said shaft to hold said shaft in its displaced position.

2. The combination according to claim 1 wherein said last-mentioned means comprises a mounting member movable with said shaft and means frictionally connecting said mounting member to said support.

3. The combination according to claim 1 wherein said shaft projects through an opening in said support, said opening being elongated in a direction parallel to the direction of movement of said other ends of said shoes, the walls of said opening preventing substantial movement of said shaft in a direction perpendicular to said direction.

4. The combination according to claim 1 wherein said last-mentioned means comprises a plate having an opening through which said shaft projects with close clearance relation, and friction clutch means connecting said plate to said support, said friction clutch means being arranged to permit movement of said plate in a direction parallel to the movement of said other ends of said shoes under brake application forces and preventing movement of said plate in a direction normal to said direction.

References Cited

UNITED STATES PATENTS 2,459,958    1/1949    Parnell _____ 188—78

FOREIGN PATENTS 1,231,849    4/1960    France.
449,527    6/1949    Italy.

MILTON BUCHLER, *Primary Examiner.*

B. MOWRY, T. W. BUCKMAN, *Assistant Examiners.*